Feb. 26, 1963  W. M. D. WRIGHT  3,078,729
OSCILLATION DRIVE AND PICK-OFF DEVICE FOR A RATE GYRO
Filed July 12, 1960
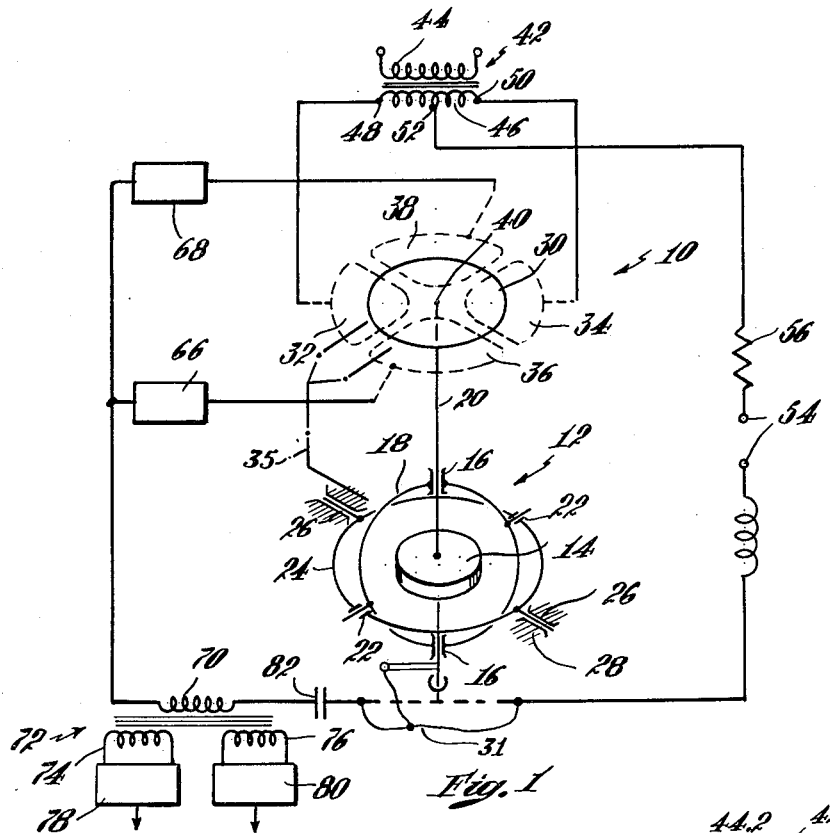
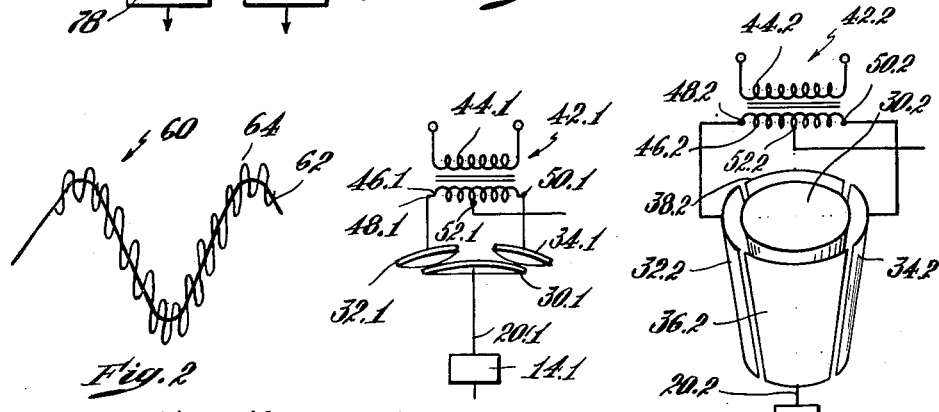
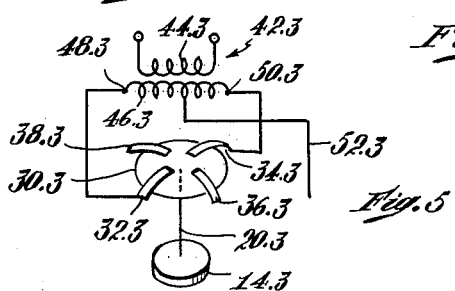
INVENTOR.
William M. D. Wright
BY
Roberts, Cushman & Grover
ATT'YS

United States Patent Office 3,078,729
Patented Feb. 26, 1963

3,078,729
OSCILLATION DRIVE AND PICK-OFF
DEVICE FOR A RATE GYRO
William M. D. Wright, Boston, Mass.
(Concord, Mass.)
Filed July 12, 1960, Ser. No. 42,318
13 Claims. (Cl. 74—5.6)

The field of this invention is that of gyro instrumentation, and the invention relates, more particularly to a rate gyro oscillation drive and pick-off device.

A rate gyro is adapted to be associated with a body so that the gyro is deflected as the body deviates from a position of static or dynamic equilibrium, and means are provided for sensing said deflections or excursions of the gyro and for transmitting signals in accordance therewith. Generally other means are also incorporated in a rate gyro for oscillating the gyro to reduce static friction therein, whereby gyro deflections can more accurately correspond with said deviations of the body.

Objects of this invention are to provide inexpensive and reliable means for sensing deflections of a rate gyro; to provide inexpensive and reliable means for transmitting signals which accurately correspond with deflections of a rate gyro; to provide inexpensive and reliable means for oscillating a rate gyro to reduce static friction therein; to provide an oscillation drive for a rate gyro which will substantially eliminate static friction within the gyro; and to provide means for oscillating a rate gyro wherein certain of said means can be utilized for indicating deflections of the gyro.

A brief summary of the nature and principal characteristics of the oscillation drive and pick-off device provided by this invention follows.

The invention comprises a gyro, including a gyro housing which is adapted to move with a body and a gyro member which is rotatable on an axis, said axis being free to move to any orientation relative to said housing; a plate which is movable with said gyro member; and a plurality of plates which are fixed relative to said housing and which are arranged in capacitive coupling with the movable plate.

The invention further comprises means for applying a frequency to at least one fixed plate for oscillating the movable plate, thereby to reduce static friction within the gyro; means for applying differing carrier frequencies to at least a pair of fixed plates so that the carrier frequencies are adapted to be modulated as the movable plate is deflected relative to the fixed plates in accordance with deviations of said body from a position of equilibrium; and means for discriminating said carrier frequencies to derive signals which are modulated in accordance with said deviations of the body.

In one embodiment of this invention, the fixed plates are four in number and are arranged symmetrically around a point in capacitive coupling with the movable plate. Means are provided for applying two superimposed frequencies to each of a pair of oppositely located plates with each frequency applied to one of the plates being in phase opposition with a corresponding frequency applied to the other plate of the pair, thereby continuously to oscillate the movable plate at two frequencies between said fixed plates for eliminating static friction within the gyro. Means are also provided for applying differing carrier frequencies to each of the four fixed plates so that said frequencies are adapted to be modulated as the movable plate is deflected relative to the fixed plates in accordance with deviations of said body from a position of equilibrium. Further means are provided for discriminating each of said carrier frequencies to derive signals which are modulated in accordance with said deviations of the body.

A detailed description of the oscillation drive and pickoff device of this invention follows and refers to the drawing in which:

FIG. 1 is a diagrammatic view of the oscillation drive and pick-off device provided by this invention;

FIG. 2 is a graph indicating the phase relation between superimposed oscillation drive frequencies;

FIG. 3 is a partial diagrammatic view similar to FIG. 1 showing an alternative embodiment of this invention;

FIG. 4 is a partial diagrammatic view similar to FIG. 1 showing another alternative embodiment of this invention; and FIG. 5 is a partial diagrammatic view similar to FIG. 1 showing another alternative embodiment of the invention.

Referring to the drawing, 10, in FIG. 1, indicates a rate gyro such as might be mounted upon a body (not shown) for indicating deviations of the body from a position of static or dynamic equilibrium. Such a rate gyro might be used, for example, for regulating means for restoring the body to its original position of equilibrium.

The rate gyro includes a gyro 12 of conventional design having a member 14 which is mounted in bearings 16 in an inner gimbal ring 18 for rotation on an axis 20. The inner gimbal ring is mounted for rotation in bearings 22 in an outer gimbal ring 24 which in turn is mounted for rotation in bearings 26 in a gyro housing 28. Suitable means (not shown) are provided on the gyro housing for securing the housing to said body in the manner conventional with rate gyros, whereby the housing is adapted to move with the body so that deflections of the gyro housing relative to the axis of rotation 20 of the gyro member 14 correspond with deviations of said body from a position of equilibrium. Alternatively, a separate gyro housing can be omitted and the outer gimbal ring of the gyro can be mounted for rotation in bearings which are housed directly within said body. Within the scope of this invention, the gyro can be driven by any suitable means for constantly rotating the member 14 on its axis 20.

According to this invention, a plate 30 of conductive material is secured to the gyro member 14 and is adapted to rotate with the member on its axis 20 and to move with the member relative to the gyro housing.

Four other plates of conductive material, 32, 34, 36 and 38 respectively, are fixed relative to the gyro housing by any suitable means as indicated at 35, either by being secured to said body or by being secured directly to said housing. The fixed plates are insulated from each other and from the gyro in any suitable manner, and are arranged in capacitive coupling with the movable plate 30. Preferably the fixed plates are arranged symmetrically around a point 40, which point is aligned with the axis 20 of the rotating gyro member 14 when the body to which the rate gyro is attached is at a normal position, for example, at a position of equilibrium.

A transformer 42 having a primary winding 44 and a secondary winding 46 is associated with the gyro, and the ends, 48 and 50, of the secondary winding are connected to the fixed plates 32 and 34 respectively. A bias voltage is then impressed upon the capacitive couplings between the movable plate 30 and the fixed plates 32 and 34 by connecting the movable plate 30 and the center 52 of the transformer secondary to a voltage source, here indicated by the terminals 54. Any conventional means such as graphite brushes, indicated at 31, for connecting the movable plate 30 to said voltage source is within the scope of this invention. Preferably, also, a current-limiting resistor 56 is inserted in this circuit in conventional manner, in addition to a choke coil for stopping the RF voltages used in the read-out system.

In this construction, a signal comprising two superimposed frequencies can be applied to the primary winding 44 of the transformer by any suitable means for impressing a signal similarly comprising two superimposed frequencies across each of the capacitive couplings between the movable plate 30 and the fixed plates 32 and 34, respectively, with each frequency applied to one of the capacitive couplings being in phase opposition with a corresponding frequency applied to the other of said capacitive couplings. As FIG. 2 graphically illustrates, the signal 60 applied to the transformer primary comprises two superimposed frequencies 62 and 64, for example of 50 c.p.s. and 5000 c.p.s. respectively, whereby the complete wave for the signal 60 would equal $100 \cos A\, 50\pi + 1 \cos B\, 5000\pi$, where A and B are the phase angles of the superimposed frequencies.

Application of said superimposed frequencies to the fixed plates 32 and 34 as above described oscillates the movable plate 30, and therefore the gyro member 14, as will be readily understood, for substantially eliminating static friction within the rate gyro. Preferably, the direction of said oscillatory motion is adapted to be oblique to the axes of rotation of the inner and outer gyro gimbal rings, whereby said oscillatory motion will maintain all parts of the gyro in substantially constant motion for eliminating static friction from all gyro bearings.

According to this invention, oscillators 66 and 68 are associated with the gyro and are connected to the movable plate 30, and to the fixed plates 36 and 38 respectively, for applying differing carrier frequencies across the capacitive couplings between the movable plate and said fixed plates. The primary winding 70 of a transformer 72 is inserted in this circuit and the two secondary transformer windings 74 and 76 are connected to conventional band-pass filters 78 and 80 respectively. The filters are tuned to the respective carrier frequencies provided by the oscillators 66 and 68 whereby the filters are adapted to discriminate said frequencies to detect signals X1 and X2 respectively, carried by said frequencies. Preferably, also, a capacitor 82 is inserted in the oscillator circuit for filtering direct current components therefrom.

In this construction, the carrier frequencies impressed across the capacitive couplings between the movable plate 30 and the fixed plates 36 and 38 are adapted to be amplitude modulated as the movable plate changes position relative to said fixed plates. Therefore, as the body to which the rate gyro is attached moves from a normal position such as a position of equilibrium, causing the gyro housing to move relative to the axis 20 of the rotating gyro member 14, the movable plate 30 will correspondingly change its position relative to the fixed plates 36 and 38 providing amplitude modulation of said carrier frequencies. Therefore the frequencies discriminated by the filters 78 and 80 will be amplitude modulated in accordance with deviations of said body from normal position. As will be readily understood, said discriminated frequencies can then be demodulated by conventional means for deriving signals which directly correspond to deviations of said body from normal position.

It should be understood that although in the embodiment of this invention here illustrated, carrier frequencies are applied to two fixed plates only, this construction has been selected primarily for convenience in illustration and that preferably carrier frequencies are applied to fixed plates 32, 34, 36 and 38 whereby deviations of said body from normal position can be detected with greater accuracy.

In FIG. 1, the movable plate 30 is shown to comprise a disc which is secured to the rotating gyro member 14 in coaxial relation thereto, and the fixed plates 32, 34, 36 and 38 each have the shape of a segment of a disc. When the fixed plates are concentrically arranged around point 40, as shown, the rate gyro construction is relatively inexpensive and is provided with a rate gyro oscillation drive and pick-off device which is satisfactory for most purposes. However, the constructions illustrated in FIGS. 3–5, where corresponding features are identified by similar decimal numbers, are alternative constructions especially adapted for particular purposes.

Thus, in FIG. 3, the movable plate 30.1 is shown to be of spherical segmental shape and the fixed plates 32.1, 34.1, only two of which are shown for purposes of illustration, each have the shape of a segment of a hollow sphere of larger diameter than the movable plate. When the fixed plates are arranged concentric with the movable plate, the device provided by this invention is adapted to read deviations of a body from normal position over a relatively wide range.

In the construction shown in FIG. 4, the movable plate 30.2 is of conical shape and is fixed to the movable gyro member 14.2 so that the apex of the cone is located at the center of movement of the movable plate and gyro member. Each of the fixed plates 32.2, 34.2, 36.2 and 38.2 has the shape of a segment of a hollow cone of larger conical angle than said movable plate and having a common apex therewith. When the fixed plates are so arranged, the device provided by this invention is adapted to read deviations of said body from a normal position with the greatest accuracy.

In the construction shown in FIG. 5, the movable plate 30.3 is a spherical segmental shape and the fixed plates 32.3, 34.3, 36.3 and 38.3 each have the shape of an uniformly narrow segment of a cylinder of larger diameter than the movable plate. When the fixed plates are arranged so that each is concentric with the movable plate as shown, amplitude modulation of respective carrier frequencies will be more nearly linear relative to deviations of the body from normal position, thereby providing signals corresponding to said deviation which can be more easily interpreted.

It should be understood that, although specific embodiments of the rate oscillation drive and pick-off device provided by this invention have been described for the purposes of illustration, this invention includes all modifications and equivalents which fall within the scope of the appended claims.

I claim:

1. In combination with a gyro, including a gyro housing and a member rotatable on an axis which is free to move to any orientation relative to the housing; a plate movable with said member; a plurality of plates fixed relative to the housing in capacitive coupling with the movable plate; means for applying a frequency to at least one of the fixed plates for oscillating the movable plate, thereby to reduce static friction within the gyro; means for applying differing carrier frequencies to at least a pair of fixed plates so that said frequencies are adapted to be modulated in accordance with movement of the movable plate relative to said fixed plates; and means for discriminating said carrier frequencies for deriving signals modulated in accordance with said movement of the movable plate.

2. In combination with a gyro, including a gyro housing and a member rotatable on an axis which is free to move to any orientation relative to the housing; a plate movable with said member; a plurality of plates fixed relative to the housing in capacitive coupling with the movable plate; means for applying two superimposed frequencies to each of a pair of fixed plates, each frequency applied to one of said plates being in phase opposition with a corresponding frequency applied to the other of said plates, thereby to oscillate the movable plate at two frequencies between said pair of plates for eliminating static friction within the gyro; means for applying differing carrier frequencies to a least a pair of fixed plates so that said frequencies are adapted to be modulated in accordance with movement of the movable plate relative to said fixed plates, and means for discriminating said carrier frequencies for deriving signals modulated in accordance with said movement of the movable plate.

3. In combination with a gyro, including a gyro housing and a member rotatable on an axis which is free to move to any orientation relative to the housing; a plate movable with said member; four plates fixed relative to said housing which are arranged symmetrically around a point in capacitive coupling with said movable plate; means for applying two superimposed frequencies to each of a pair of oppositely-located fixed plates, each frequency applied to one of said plates being a phase opposition with a corresponding frequency applied to the other plate of the pair, thereby to oscillate the movable plate at two frequencies between said pair of plates for eliminating static friction within the gyro; means for applying differing carrier frequencies to the four fixed plates so that said frequencies are adapted to be modulated in accordance with movement of the movable plate relative to said fixed plates; and means for discriminating said carrier frequencies for deriving signals modulated in accordance with said movement of the movable plate.

4. The combination as set forth in claim 3 wherein said movable plate is disc-shaped and is fixed to said gyro member in coaxial relation thereto, and wherein said fixed plates each have the shape of a segment of a disc, said fixed plates being insulated from each other and being concentrically arranged in capacitive coupling with said movable plate.

5. The combination as set forth in claim 3 wherein said movable plate is of spherical segmental shape and is fixed to said gyro member for movement with said member, said plate being arranged concentric with the path of movement of said plate, and wherein said fixed plates each have the shape of a segment of a hollow sphere of larger diameter than said movable plate, said fixed plates being insulated from each other and being concentrically arranged with said movable plate in capacitive coupling with said movable plate.

6. The combination as set forth in claim 3 wherein said movable plate is of spherical segmental shape and is fixed to said gyro member for movement with said member, said plate being arranged concentric with the path of movement of said plate and wherein said fixed plates each have the shape of a segment of an hollow cylinder of larger diameter than said movable plate, each of said plates being of uniform width narrow relative to said movable plate, said fixed plates being insulated from each other and being symmetrically arranged in capacitive coupling with said movable plate so that each fixed plate is concentric with said movable plate.

7. In combination with a gyro, including a gyro housing and a member rotatable on an axis which is free to move to any orientation relative to the housing; a plate movable with the gyro member; a pair of plates fixed relative to the housing in capacitive coupling with the movable plate; and means for applying two super imposed frequencies to each of the fixed plates, each frequency applied to one of the fixed plates being in phase opposition with a corresponding frequency applied to the other fixed plate, thereby to oscillate the movable plate at two frequencies between said fixed plates for eliminating static friction within the gyro.

8. In combination with a gyro, including a gyro housing and a member rotatable on an axis which is free to move to any orientation relative to the housing; a plate movable with the gyro member; a plurality of plates fixed relative to the housing in capacitive coupling with the movable plate; means for applying differing carrier frequencies to the fixed plates so that said frequencies are adapted to be modulated in accordance with movement of the movable plate relative to the fixed plates; and means for discriminating said carrier frequencies for deriving signals modulated in accordance with said movement of the movable plate.

9. In combination with a gyro, including a gyro housing and a member rotatable on an axis which is free to move to any orientation relative to the housing; a plate movable with said gyro member; a plate fixed relative to the housing in capacitive coupling with the movable plate; and means for applying a frequency to the fixed plate for oscillating the movable plate, thereby to reduce static friction within the gyro.

10. In combination with a gyro, including a gyro housing and a member rotatable on an axis which is free to move to any orientation relative to the housing; a plate movable with the gyro member; a plurality of plates fixed relative to the housing in capacitive coupling with the movable plate; oscillator means for applying differing carrier frequencies to the fixed plates so that said frequencies are adapted to be modulated in accordance with movement of the movable plate relative to the fixed plates; and band-pass filter means for discriminating said carrier frequencies for deriving signals modulated in accordance with said movement of the movable plate.

11. In combination with a gyro, including a gyro housing and a member rotatable on an axis which is free to move to any orientation relative to the housing; a plate movable with the gyro member; four plates fixed relative to said housing which are arranged symmetrically around a point in capacitive coupling with the movable plate; means for applying two superimposed frequencies to each of a pair of oppositely-located fixed plates, each frequency applied to one of said plates being in phase opposition with a corresponding frequency applied to the other plate of the pair, thereby to oscillate the movable plate at two frequencies between said pair of plates for eliminating static friction within the gyro; oscillator means for applying differing carrier frequencies to each of the fixed plates so that said frequencies are adapted to be modulated in accordance with movement of the movable plate relative to said fixed plates; and band-pass filter means for discriminating said carrier frequencies for deriving signals modulated in accordance with said movement of the movable plate.

12. In combination with a gyro, including a gyro housing and a member rotatable on an axis which is free to move to any orientation relative to the housing; a plate movable with the gyro member; four plates fixed relative to said housing which are arranged symmetrically around a point in capacitive coupling with the movable plate; transformer means having a primary and a secondary winding; said secondary winding being connected at its ends to respective plates of a pair of oppositely-located fixed plates and at its center to said movable plate; means for applying two superimposed frequencies to the primary winding of the transformer, whereby two superimposed frequencies are applied to each of said pair of fixed plates with each frequency applied to one of said plates being in phase opposition with a corresponding frequency applied to the other plate of the pair, thereby to oscillate the movable plate at two frequencies between said fixed plates for eliminating static friction within the gyro; oscillator means for applying differing carrier frequencies to each of the four fixed plates so that said carrier frequencies are adapted to be modulated in accordance with movement of the movable plate relative to said fixed plates and band-pass filter means for discriminating said carrier frequencies for deriving signals modulated in accordance with the movement of said movable plate.

13. In combination with a gyro, including a gyro housing and a member rotatable on an axis which is free to tilt in any direction relative to the housing: a conical plate coaxially attached to said member for movement therewith, said plate being positioned relative to said member so that the apex of the cone is stationary with respect to said housing; four plates fixed relative to said housing, said fixed plates each having the shape of a segment of a hollow cone which is of larger conical angle than said conical plate and has a common apex therewith, said fixed plates being arranged symmetrically around said hollow cone and insulated from each other for capacitive coupling with said movable plate; means for applying two superimposed frequencies to each of a pair of oppositely-located fixed plates, each frequency applied to one of said plates being in phase opposition with a corresponding frequency applied to the other plate of the pair, thereby to oscillate the movable plate at two frequencies between said pair of plates for eliminating static friction within the gyro; means for applying differing carrier frequencies to said four fixed plates such that said frequencies are adapted to be modulated in accordance with movement of said conical movable plate relative to said fixed plates; and means for discriminating said carrier frequencies for deriving signals modulated in accordance with said movement of the movable plate.

References Cited in the file of this patent
UNITED STATES PATENTS

| | | |
|---|---|---|
| 2,393,473 | Jones | Jan. 22, 1946 |
| 2,633,028 | Fillebrown | Mar. 21, 1953 |
| 2,919,585 | Schroeder | Jan. 5, 1960 |